(12) United States Patent
Regnier et al.

(10) Patent No.: US 7,425,033 B2
(45) Date of Patent: Sep. 16, 2008

(54) VEHICLE SUNROOF ASSEMBLY

(75) Inventors: Luc R. Regnier, Toronto (CA); Noel Chingcuanco, North York (CA); Denis Cloutier, Newmarket (CA); Ed Fortin, Newmarket (CA)

(73) Assignee: Intier Automotive Closures Inc., Newmarket, Ontario (CA)

( * ) Notice: Subject to any disclaimer, the term of this patent is extended or adjusted under 35 U.S.C. 154(b) by 66 days.

(21) Appl. No.: 10/569,005

(22) PCT Filed: Aug. 3, 2004

(86) PCT No.: PCT/CA2004/001591

§ 371 (c)(1),
(2), (4) Date: Feb. 21, 2006

(87) PCT Pub. No.: WO2005/021306

PCT Pub. Date: Mar. 10, 2005

(65) Prior Publication Data

US 2006/0284450 A1    Dec. 21, 2006

(51) Int. Cl.
*B60J 7/057* (2006.01)
*B60J 7/05* (2006.01)

(52) U.S. Cl. ................................ 296/223; 296/221

(58) Field of Classification Search ..... 296/216.01–224
See application file for complete search history.

(56) References Cited

U.S. PATENT DOCUMENTS

| | | | | |
|---|---|---|---|---|
| 4,223,942 | A * | 9/1980 | DeLuca | 296/222 |
| 4,655,500 | A * | 4/1987 | Cunningham | 296/223 |
| 4,725,092 | A | 2/1988 | Reintges et al. | |
| 4,893,870 | A * | 1/1990 | Moriya et al. | 296/223 |
| 5,238,290 | A * | 8/1993 | Farmont | 296/216.03 |
| 6,390,544 | B1 | 5/2002 | Manders et al. | |
| 6,428,091 | B2 * | 8/2002 | Ito et al. | 296/221 |
| 7,059,669 | B2 * | 6/2006 | Oberheide | 296/223 |

* cited by examiner

Primary Examiner—Dennis H Pedder
(74) Attorney, Agent, or Firm—Clark Hill PLC

(57) ABSTRACT

A sunroof assembly has a frame, including two tracks, that mount to a vehicle roof. An arm is slidably mounted in each track, with each arm including attachment points for mounting a panel or a bracket holding a panel thereto. A trolley is slidably mounted in each track and engages the arm. Each trolley has a threaded bore in meshing engagement with a power screw rotatably mounted in the track. A single motor is coupled via a transmission to two flexible drive cables, each of which is connected to one of the power screws. This basic structure minimizes the component count of the sunroof, and hence its manufacturing costs.

22 Claims, 13 Drawing Sheets

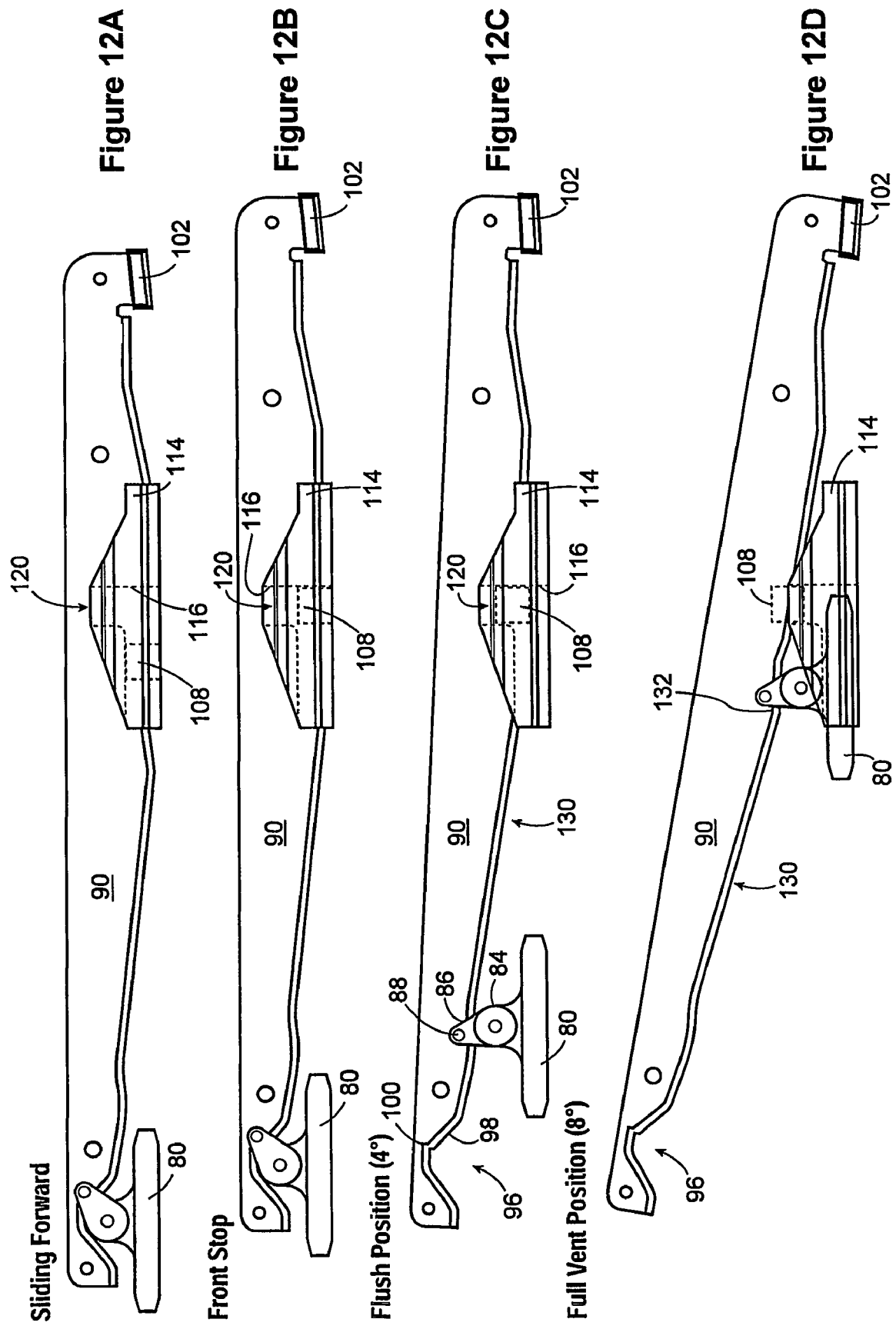

VEHICLE SUNROOF ASSEMBLY

FIELD OF THE INVENTION

The invention generally relates to panel closure assemblies such as vehicle sunroofs.

BACKGROUND OF INVENTION

Vehicle sunroofs are well known in the art. One of the drawbacks with existing sunroofs is the fact that they are typically composed of many parts, which adds cost and decreases reliability. It is desirable to provide a functionally robust sunroof, for example, to provide tilt and slide functions, whilst minimizing the component count.

SUMMARY OF THE INVENTION

According to one aspect of the invention an apparatus is provided for tilting and sliding a panel (such as a sunroof relative to a support surface (such as a vehicle roof having an opening therein selectively coverable by the panel. The apparatus includes: a frame, including a track, for mounting to the support surface; a lifter arm for mounting the panel thereon, wherein the lifter arm includes at least one foot disposed to slide along the track and the track includes a stop cooperating with the lifter arm to arrest its linear translation along the track; a cam follower disposed to slide along the track; and an actuator for linearly translating the cam follower. The lifter arm includes a cam profile and the cam follower is co-operable therewith to linearly translate the lifter arm until its linear motion is arrested and to pivotably tilt the lifter arm when its linear motion is arrested.

According to another aspect of the invention, the apparatus includes: a frame, including a track, for mounting to the support surface; a lifter arm for mounting the panel thereon, wherein the lifter arm includes at least one foot disposed to slide along the track and the track includes a stop cooperating with the lifter arm to arrest its linear translation along the track, and wherein the lifter arm includes a cam profile; a wedge disposed to slide parallel to the track; and an actuator for linearly translating the wedge. The lifter arm includes a cam profile having a detent portion enabling the wedge to linearly translate the lifter arm until its linear motion is arrested. The wedge moves out of the detent portion to follow the remainder of the cam profile and pivotably tilt the lifter arm when its linear motion is arrested.

According to another aspect of the invention the apparatus includes: a frame, including one or more tracks, for mounting to the support surface; one or more lifter arms for mounting the panel thereon, wherein each lifter arm includes at least one foot disposed to slide along one of the tracks and each track includes a stop cooperating with the corresponding lifter arm to arrest its linear translation along the track; a trolley disposed to slide along each track; and an actuator for linearly translating the trolleys. Each lifter arm has a cam surface and each corresponding trolley includes a wedge which cooperates with the cam profile to linearly translate the lifter arm along the corresponding track as the trolley is translated when the lifter arm is free to linearly translate and to pivotably tilt the lifter arm as the trolley is further translated when the lifter arm is arrested from linearly translating.

According to another aspect of the invention a sunroof assembly is provided which includes: a frame, including two linear tracks, for mounting to a vehicle roof; two arms, each slidably mounted in one of the linear tracks, the arms including attachment points for mounting a panel or a bracket holding a panel thereto; two power screws, each rotatably mounted in one of the linear tracks; two trolleys, each trolley being slidably mounted in one of the tracks and engaging one of said arms, each trolley having a threaded bore in meshing engagement with one of the power screws; a single motor; two flexible drive cables, each connected to one of the power screws; and a transmission for coupling the two flexible drive cables to the single motor.

According to another aspect of the invention, an actuator is provided for driving a panel enclosure slidably mounted on a frame between an open position and a closed position. The actuator includes: two power screws rotatably mounted in the frame along parallel sides thereof; two trolleys, each trolley engaging one of said parallel sides and having a threaded bore in meshing engagement with one of the power screws; a single motor; two flexible drive cables, each connected to one of the power screws; and a transmission for coupling the two flexible drive cables to the single motor.

BRIEF DESCRIPTION OF DRAWINGS

The foregoing and other aspects of the invention will be understood and appreciated more fully from the following detailed description taken in conjunction with the following drawings, in which:

FIGS. 12A-12D are schematic views of the lifter arm in relation to the arresting block of the track taken at different operating positions.

DETAILED DESCRIPTION OF PREFERRED EMBODIMENTS

Figure 1:
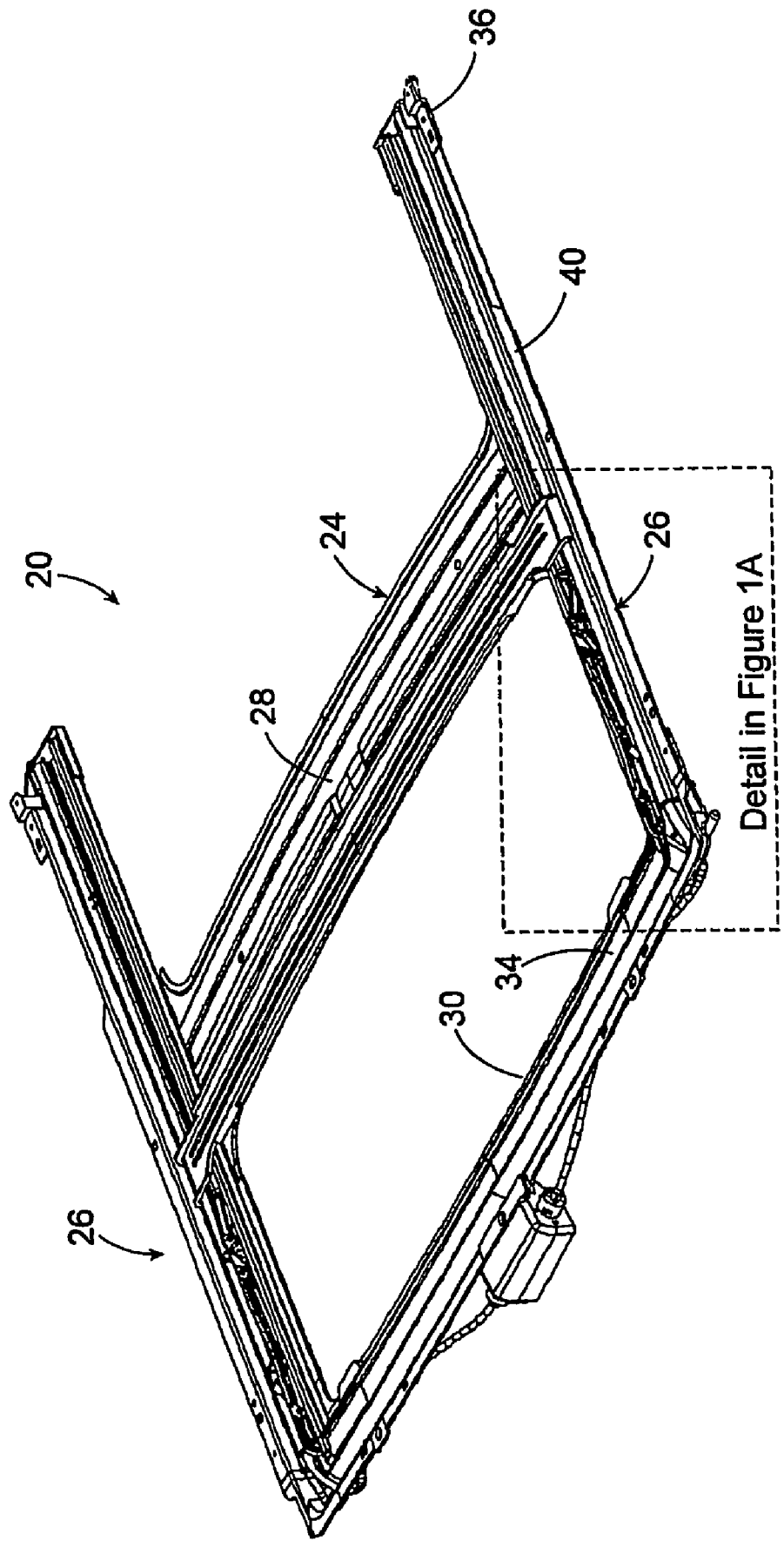
FIG. 1 is a perspective view of a sunroof mechanism according to one embodiment of the invention.
Figure 1A:
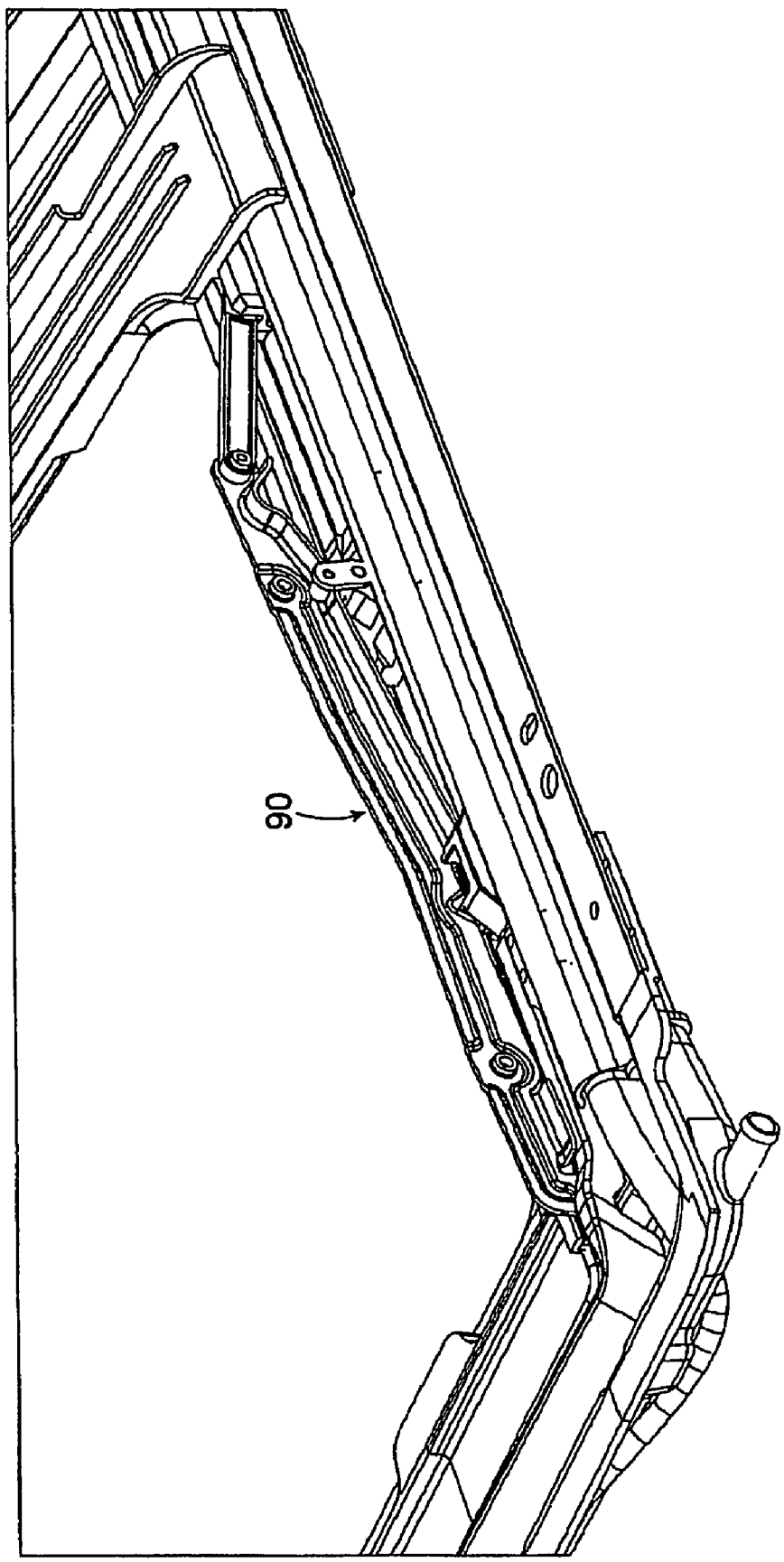
FIG. 1A is a detail view of an indicated portion of FIG. 1.
Figure 2:
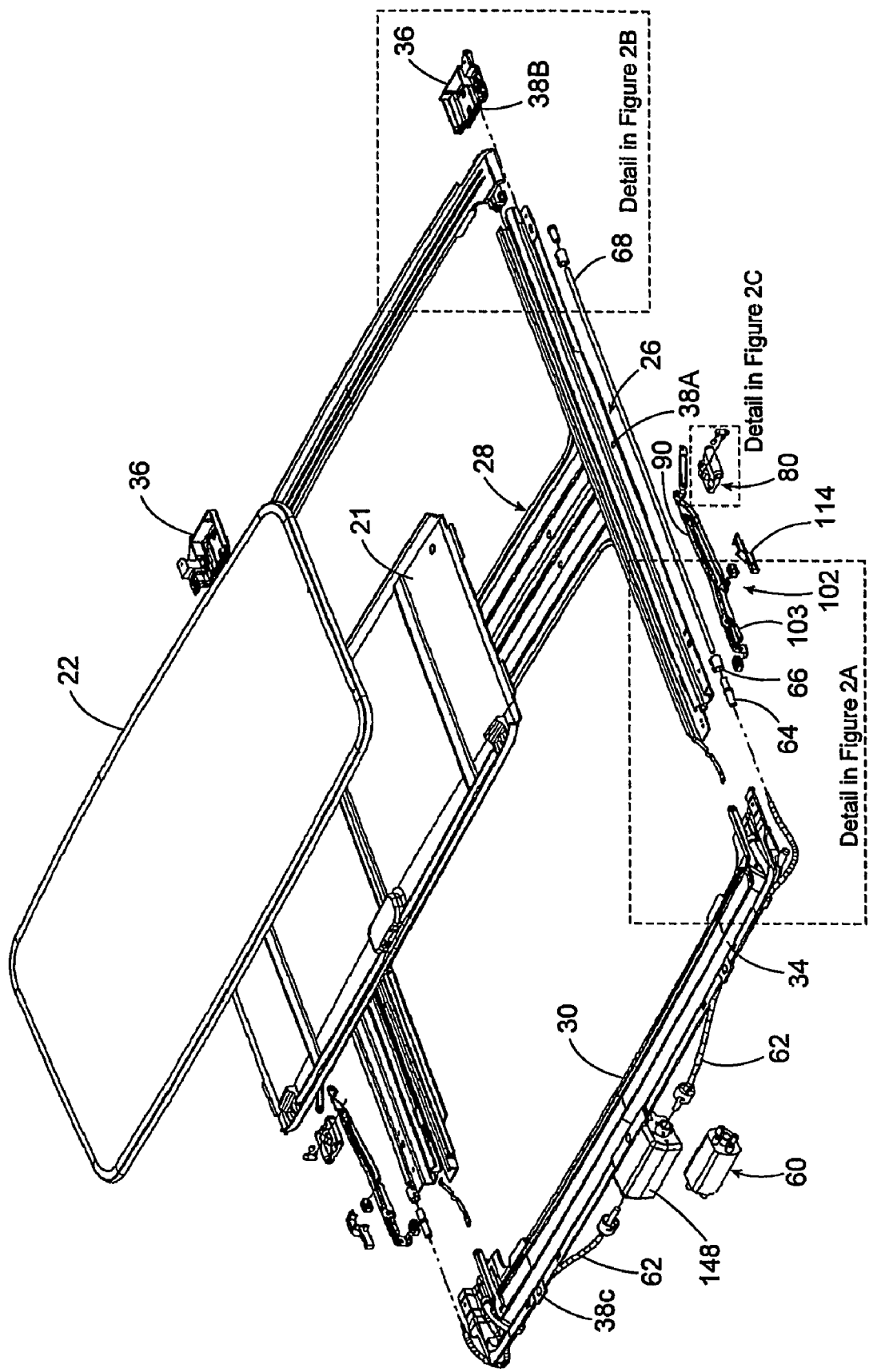
FIG. 2 is an exploded view of the sunroof shown in FIG. 1, including panel enclosures.
Figure 2A:
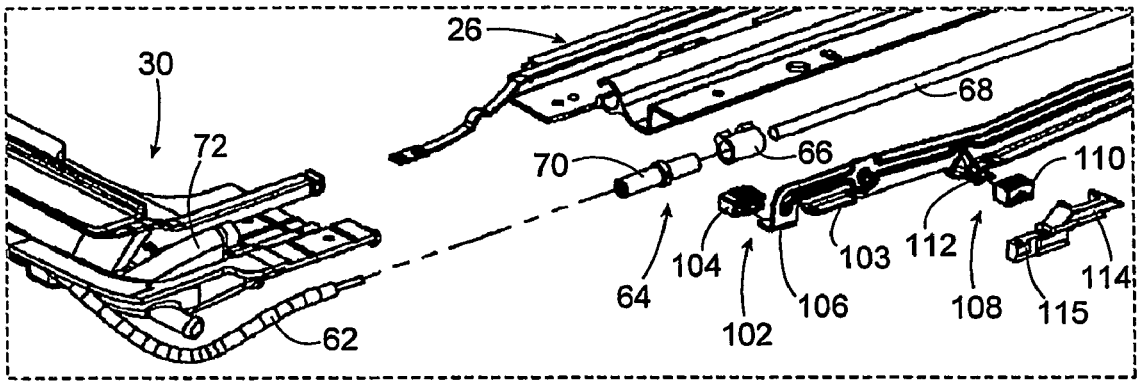
FIGS. 2A, 2B and 2C are detailed views of indicated portions of FIG. 2.
Figure 2B:
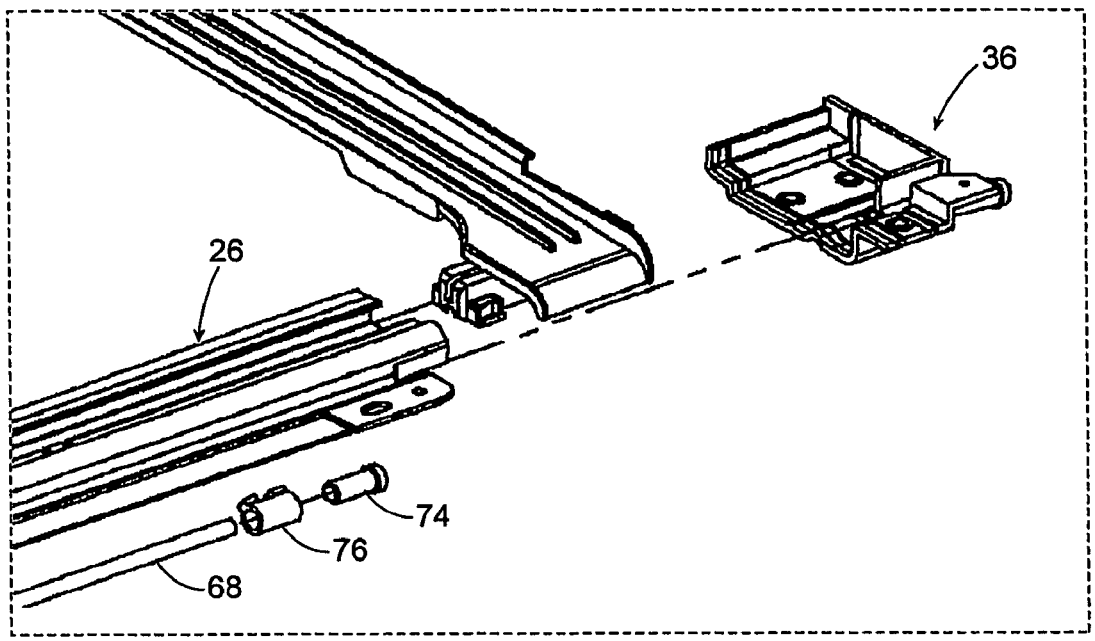
Figure 2C:
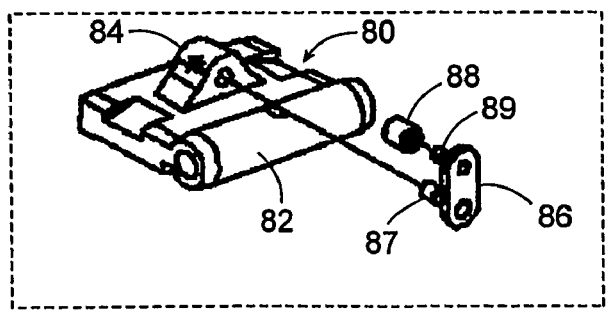
Figure 3:
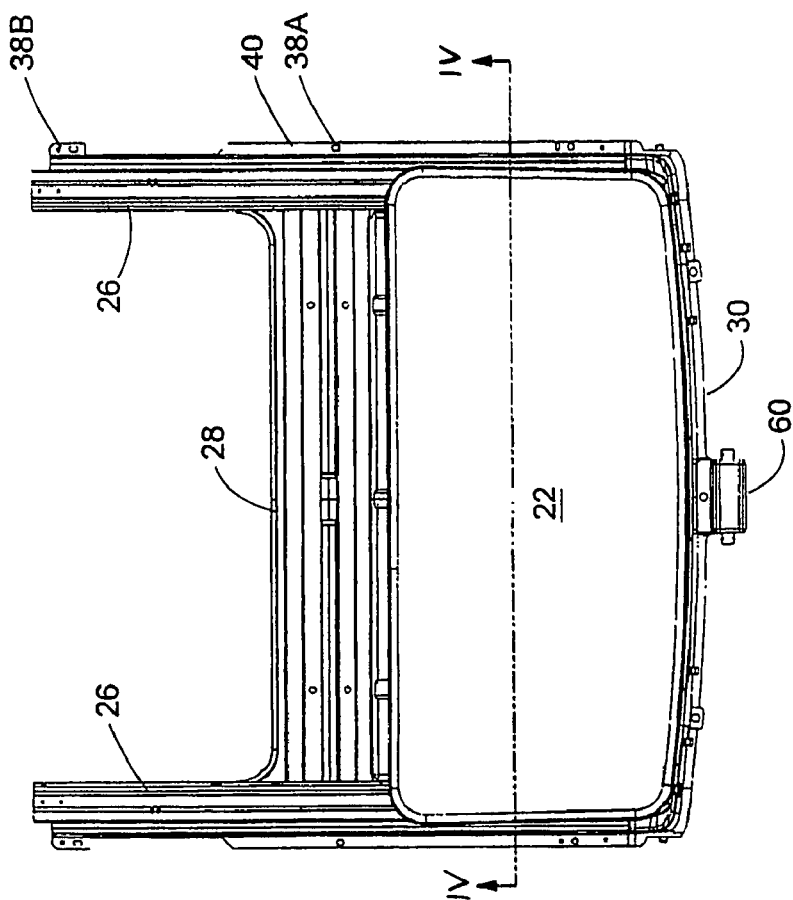
FIG. 3 is a top view of a frame structure employed in the sunroof of FIG. 1.

FIG. 1 shows a sunroof assembly, generally designated by ref. no. 20, which is mountable in a vehicle roof (not shown) having a suitable sized opening. The assembly 20 includes a roof enclosure, such as a metallic or glass panel, which is not shown in FIG. 1. The exploded view of FIG. 2, however, shows an opaque roof cover or sunshade 21 and a translucent glass panel 22 forming part of the assembly. FIG. 3 shows a top view of the assembly illustrated in FIG. 3. As described in greater detail below, the sunroof drive mechanism slides the glass panel 22 between an open and closed position, and enables the panel 22 to tilt in the open position. The sunshade 21 is dragged by the glass panel 22, at least from closed to open position, and may be independently moved to the closed position. It will be understood that the sunroof 20 may incorporate a variety of panels in the alternative, e.g., a metal panel.

In addition to the panel 22, the major structural components of the sunroof assembly 20 include a frame 24 comprising two linear tracks 26, a cross-brace member 28, and a front trough or brace member 30 including a wind deflector 34 which is pivotally mounted to the front brace 30.

Each linear track 26 is terminated at its rear end by a bracket 36 which is fixed to the linear track 26 and the vehicle roof via bolts or screws at holes 38B formed in the bracket 36. Track 26 also includes a number of additional bolt holes 38A in a flange 40 for mounting the frame 24 to the vehicle roof. The front brace 30 also includes a number of bolt holes 38C for the same purpose.

Figure 4:
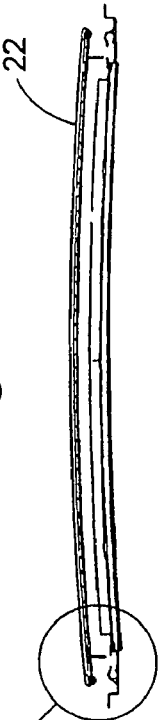
FIG. 4 is a cross-sectional view taken across line IV-IV in FIG. 3.
Figure 4A:
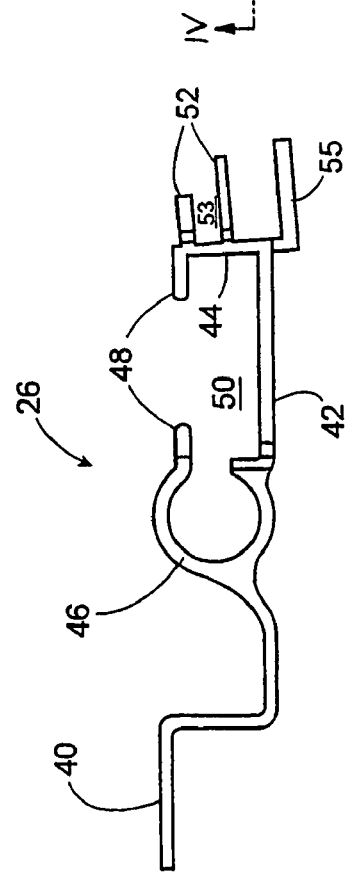
FIG. 4A is a detailed view of an indicated portion of FIG. 4.
Figure 10:
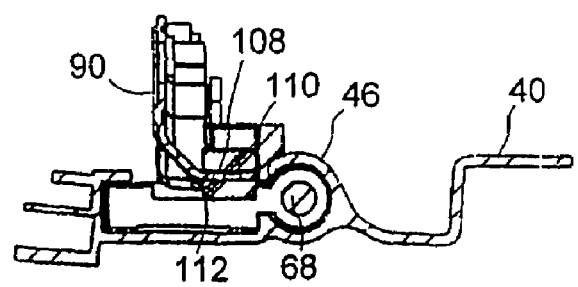
FIG. 10 is a cross-sectional view taken across line X-X in FIG. 8.

Referring to the cross-sectional profile of the sunroof assembly 20 shown in FIG. 4 and the isolated plan view of track 26 in FIG. 10, it will be seen that each track 26 includes a bottom wall 42, a linear side wall 44, an arcuate side wall 46 and a slotted top wall 48 which collectively define a trolley guide 50 as described in greater detail below. The arcuate side wall 46 also defines a housing for a screw, as described in greater detail below. Two flanges 52 extend from the linear side wall 44 to provide a channel 53 for holding the sunshade 21 and enabling it to slide in the assembly. Another flange 55 extends from the sidewall 44 and provides a mounting area for roof trim. The flange 40 used to mount the sunroof assembly 20 to the vehicle roof extends from the arcuate side wall 46, as illustrated. The track structure enables it to be preferably formed from extruded aluminum.

Figure 5:
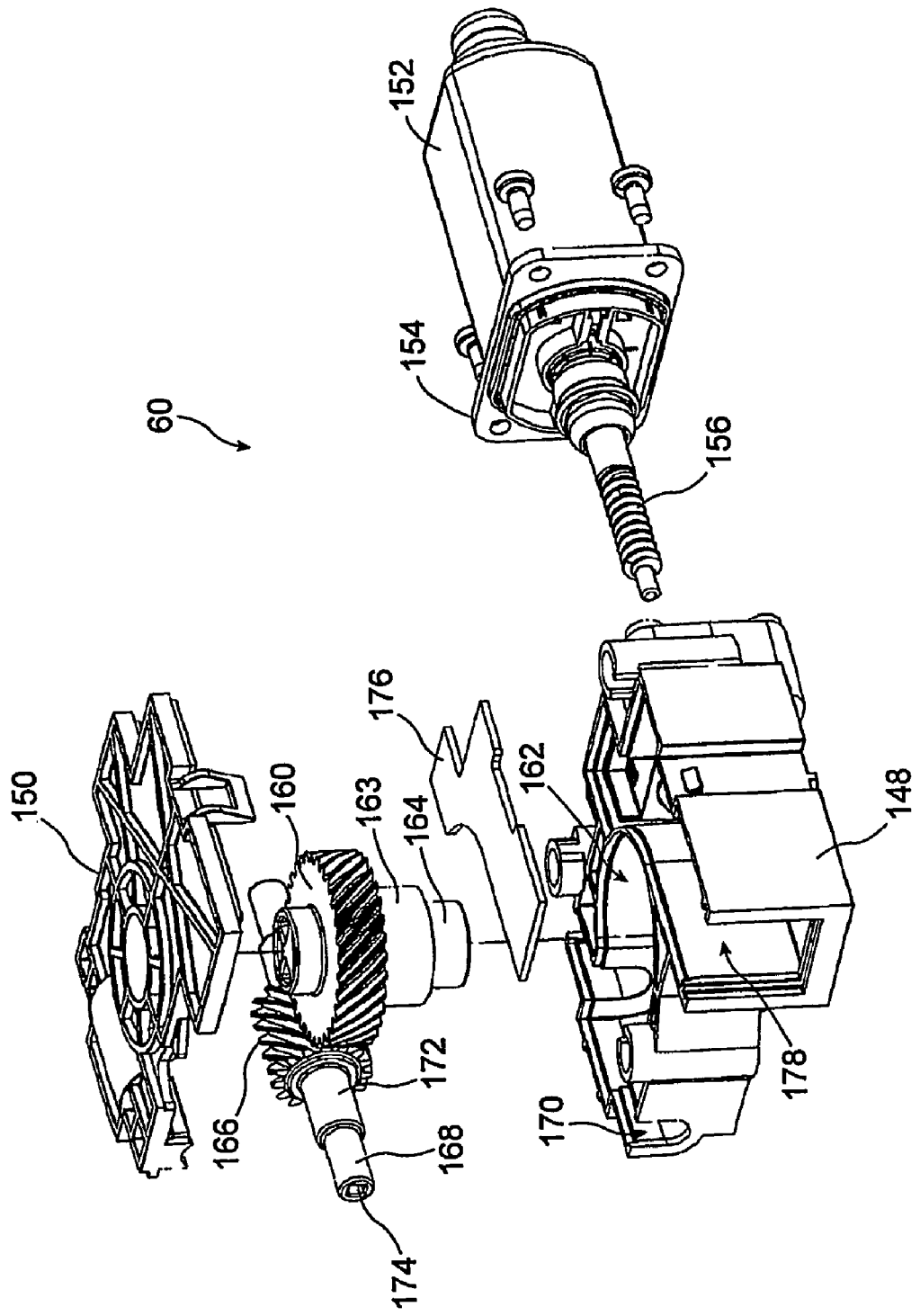
FIG. 5 is an exploded view of an electric actuator employed in the preferred embodiment.
Figure 5A:
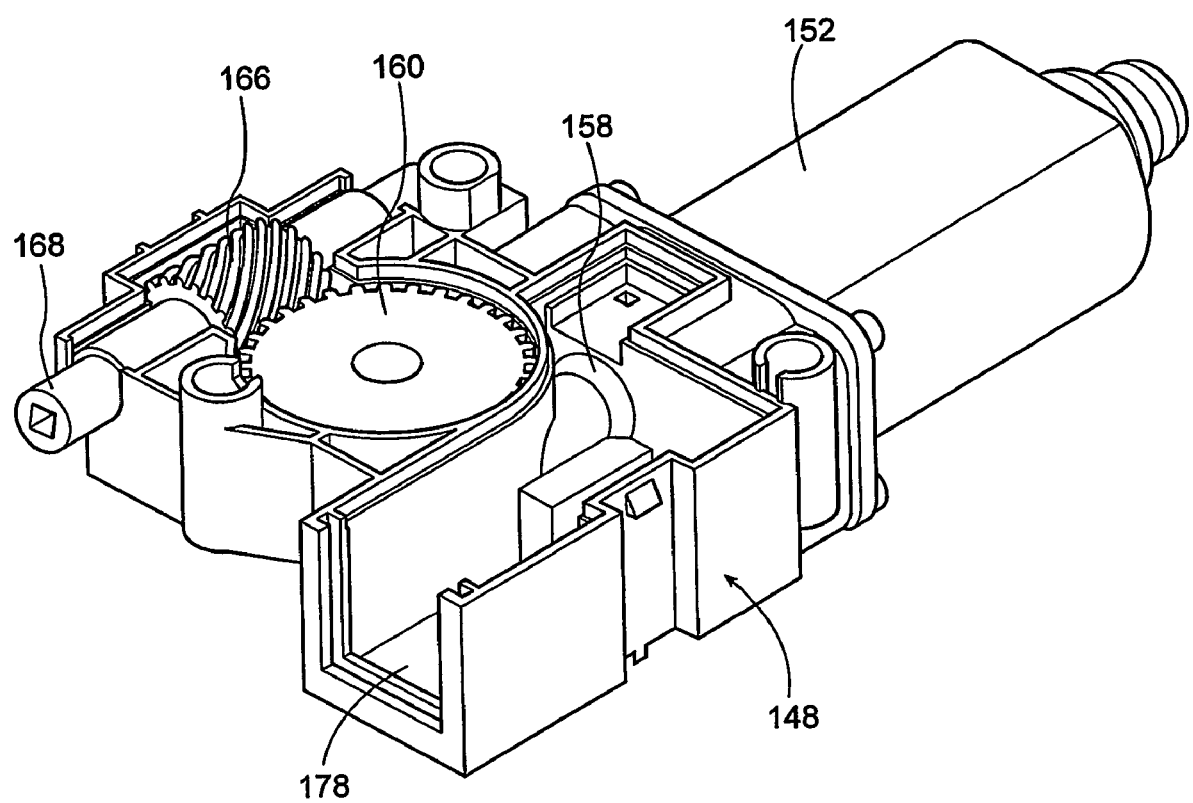
FIG. 5A is an assembled view of the actuator shown in FIG. 5.

The drive mechanism controlling the movement of the panel 22 preferably includes an electric actuator 60 which is mounted to the front brace 30 and is operatively connected to two flexible drive cables 62. FIGS. 5 and 5A shows the actuator 60 in greater detail, which includes a gearbox comprising housing 148 (that is mounted to the front brace 30 as seen in FIG. 2) and a cover 150. A motor 152 is mounted to an external face of the housing 148 via flange 154. The output shaft of the motor 152 has a worm 156 mounted thereto that seats in a compartment 158 (seen best in FIG. 5A) of the housing. The compartment 158 is sealed from the top but has an opening (not shown) that enables the worm 156 to mesh with a reduction gear 160 that is mounted on a shaft 164 journalled in an adjacent compartment 162 via a sleeve bearing 163. The reduction gear 160, in turn, meshes with a helical output gear 166 mounted onto a double-ended output shaft 168 that is rotatably journaled in an adjacent compartment 170 via sleeve bearings 172. The double-ended shaft includes sockets 174 on each endface thereof for receiving a co-operating bit of the flexible drive cables 62 (not shown in FIGS. 5 or 5A—see FIG. 2). A printed circuit board 176 for controlling the motor may be mounted in the gearbox, preferably in the space 178 over compartment 158 since that space is isolated from the gear train.

Figure 6:
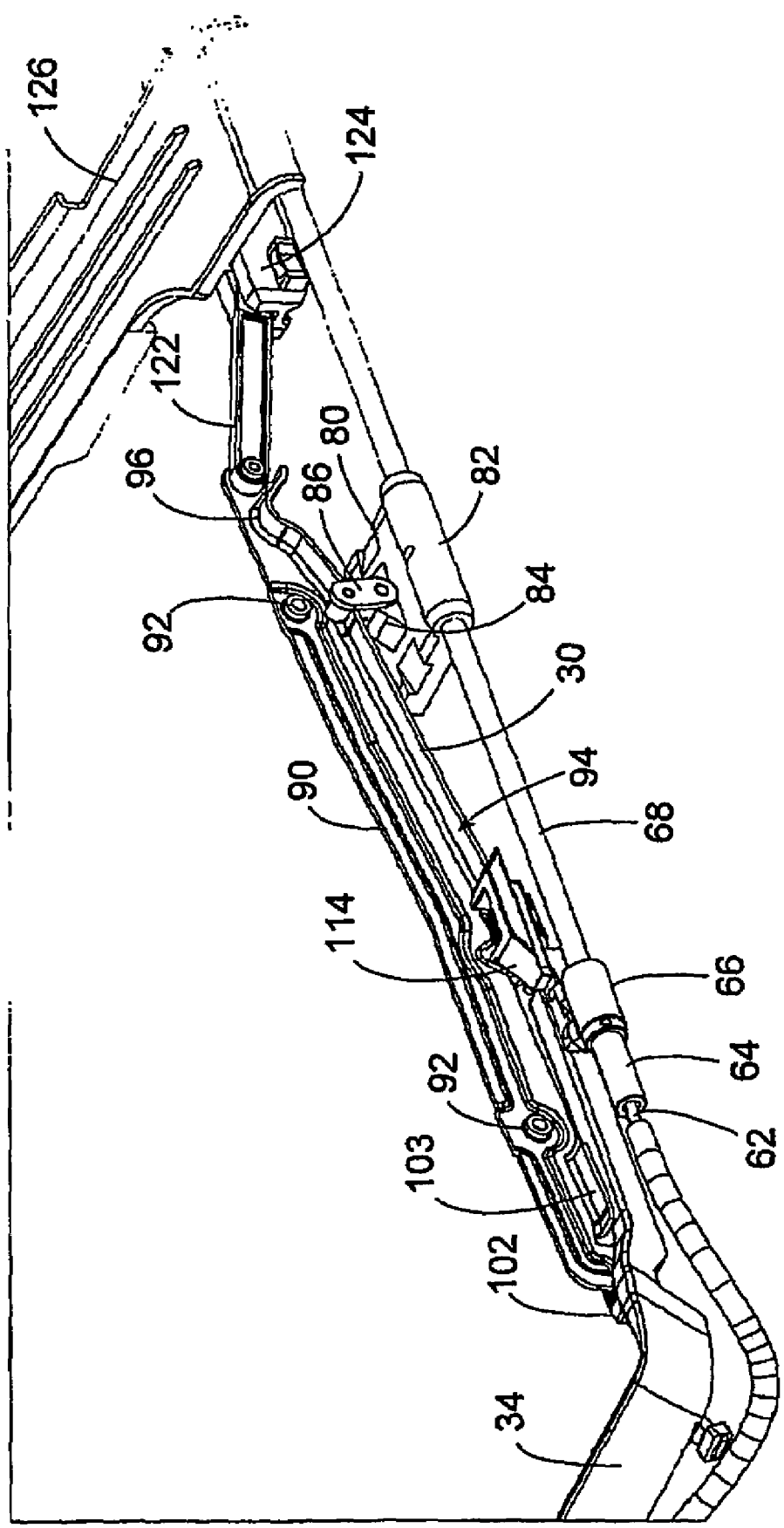
FIG. 6 is a fragmentary perspective view of the sunroof portion shown in FIG. 5, with a track removed from the drawing.

As seen best in FIGS. 2 and 6, each flexible drive cable 62 is connected via a tubular coupling 64 to one of two power screws 68, each of which is disposed in the screw housing portion of track 26 and is free to rotate therein. More particularly, at one end of each screw 68 the tubular coupling 64 has a shaft 70 that is partially rotatably mounted in a cowl 72 provided in the front brace 30. The flexible drive cable 62 has a flat head fitted into this end of the shaft 70. The end portion of screw 68 is crimped into the other end of the shaft 70. A bushing 66 is fixedly mounted to the screw-housing portion of track 26 and the coupling 64 rotates in the bushing 66. At the other end of each screw 68, a bushing or bearing 76 is likewise affixed to screw-housing portion of track 26 and the screw 68 is mounted in a tubular coupling 74 which is journalled in the bushing 76. Each screw 68 is thus rotatably mounted in the screw housing portion of track 26 and constrained from axial movement therein.

Figure 9:
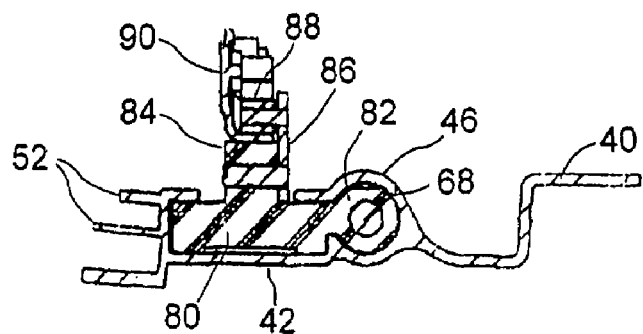
FIG. 9 is a cross sectional view taken across line IX-IX in FIG. 8.
Figure 8:
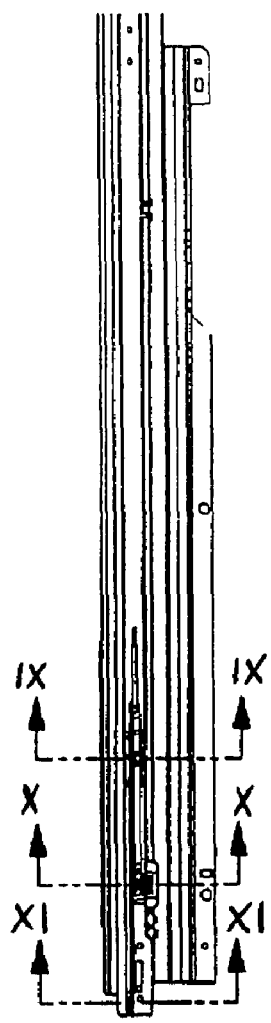
FIG. 8 is a top view of the track and a lifter arm disposed therein.

As seen best in FIGS. 2, 6 and 9, the sunroof drive mechanism includes two trolleys 80, each having a cross-sectional profile designed to slide in the guide portion 50 of track 26. Each trolley has an arcuate portion 82 which is disposed to slide in the screw housing and includes a threaded axial bore in meshing engagement with power screw 68. Each trolley 80 also includes a wedge 84 mounted on or preferably integrally formed with the trolley body. An arm 86 is pivotally mounted to wedge 84 via a pin 87, and a roller 88 is rotatably mounted to arm 86 via a second pin 89.

Figure 11:
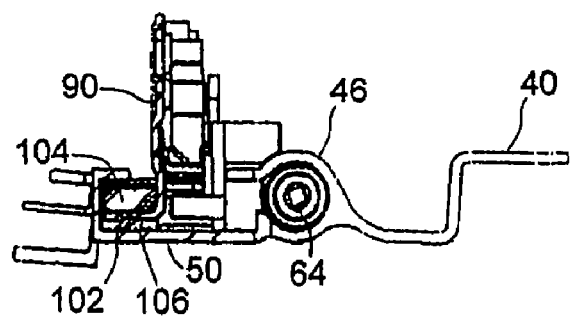
FIG. 11 is a cross-sectional view taken across line XI-XI in FIG. 8.

The panel 22 is mounted (at mounting points 92) onto two preferably metallic lifter arms 90. Each lifter arm 90 includes at least one foot disposed in track 26. As seen best in FIGS. 2 and 11, each lifter arm 90 of the illustrated embodiment includes a front slider 102, comprising a plastic block 104 mounted onto a front foot 106, which is disposed to slide in the guide portion 50 of track 26. As seen best in FIGS. 2 and 10, each lifter arm 90 also includes a lock element 108, comprising a plastic block 110 mounted onto a side foot 112, which is disposed to slide in the guide portion 50 of track 26. The lock element 108 provides both a sliding function and a locking function as described in greater detail below. In practice, the front slider 102 and lock elements 108 can be formed as an integral part of the lifter arm 90.

Each lifter arm 90 is engaged by one trolley 80 for the driving movement thereof. More particularly, as seen best in FIGS. 6 and 12, the lifter arm 90 includes a flange 94 which functions as a cam surface. The cam surface of the illustrated embodiment is characterized by (i) a detent portion 96 having a pushing surface 98 and an abutment 100 (see FIG. 12), and (ii) an inclined portion 130, including a flat section 132 (see FIG. 12). As seen also in FIG. 9, the wedge 84 of trolley 80 engages the underside of flange 94 and the roller 88 of the trolley 80 engages the top side of the flange 94. The wedge and roller thus function as a cam follower in some respects, as discussed in greater detail below.

Figure 7:
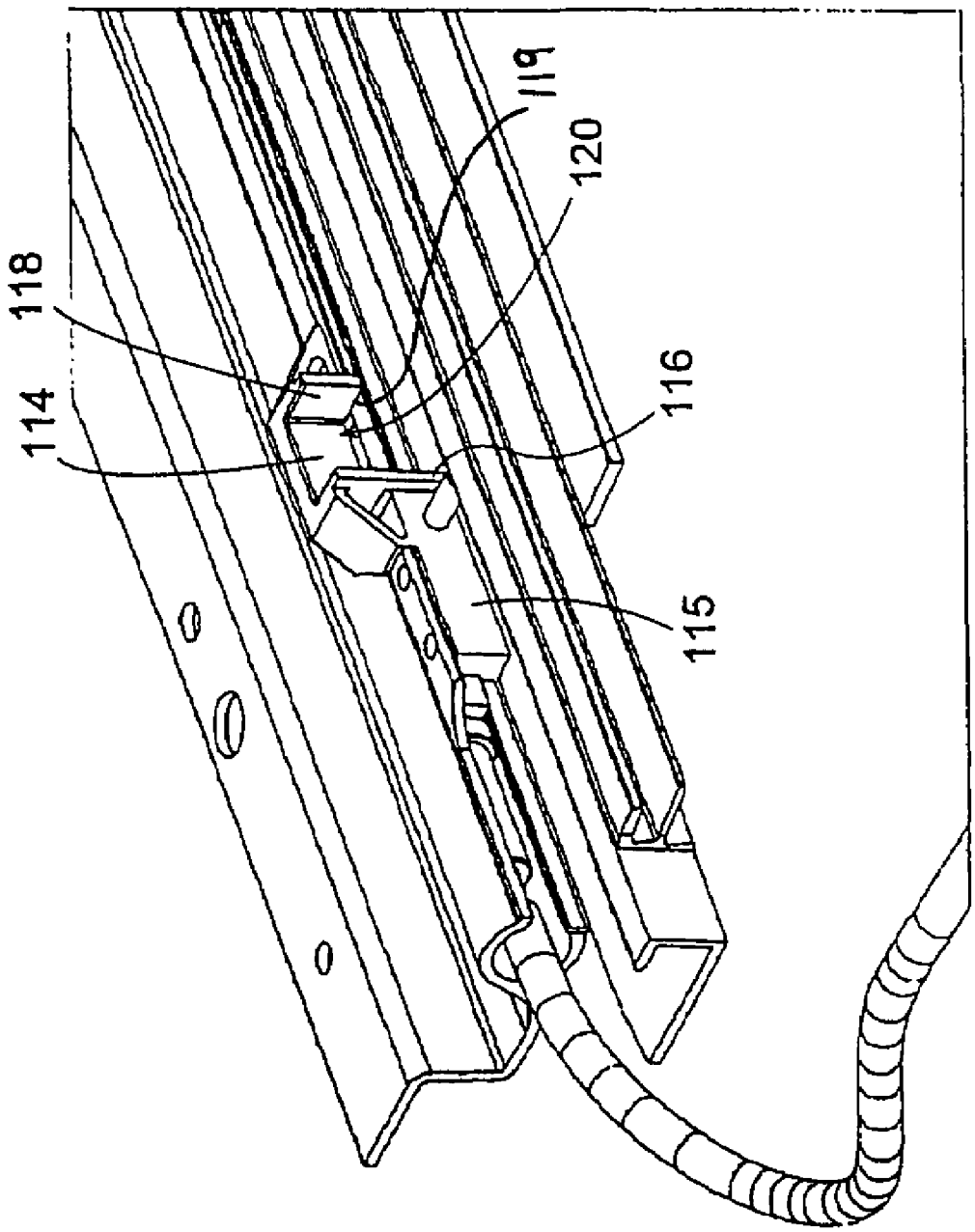
FIG. 7 is a fragmentary perspective view of the sunroof portion shown in FIG. 5, detailing the construction of the track and an associated arresting block.

As seen best in the partial assembly view of FIG. 7, an arresting block 114 is fitted into each track 26. The block 114 includes a mounting portion 115 affixed to guide portion 50 of track 26 and includes a stop wall 116 disposed in the guide portion 50 which co-operates with lock element 108 of lifter arm 90 as discussed in greater detail below. The arresting block 114 also includes an opposite wall 118 disposed above the guide portion 50 of track 26 which, in conjunction with wall 116, defines a locking channel 120, as discussed in greater detail below.

As seen best in FIGS. 2 and 6, each lifter arm 90 is also connected via a pivot or articulated linkage 122 to a rear slider 124 disposed to glide in the guide portion 50 of track 26. A rain gutter 126 is mounted to the rear sliders 124. The lifter arm 90 also has an integral tab 103 for engaging the wind deflector 34 as discussed in greater detail below.

The operation of the drive mechanism is schematically illustrated in FIGS. 12A to 12D. In the description that follows, the drive mechanism is discussed in relation to components disposed in one of the tracks 26, it being understood that the operation of the drive mechanism is identical in the other track. FIG. 12A shows the sunroof in a sliding mode of operation, wherein the lifter arm 90 is translated in unison with the trolley 80. More particularly, in this mode the wedge 84 is positioned in the detent portion 96 of the lifter arm cam profile. When the trolley 80 is translated in the forward direction as a result of rotating the power screw 68 in the appropriate direction, the wedge 84 engages the pushing surface 98 of the cam profile thus conveying the translation force to the lifter arm 90. The lifter arm 90 thus slides along the track 26, and the panel 22, which is affixed to the lifter arm 90, thus also slides linearly. Note that the natural tendency of the trolley pivot arm 86 to rotate backwards as the lifter arm 90 is moved forward is checked by the abutment 100 in the cam profile that obstructs the rearward progression of the roller 88. The abutment 100 also functions to prevent the lifter arm 90 from slipping when the trolley 80 is translated in the rearward direction.

The frame 24 is preferably installed at a slight angle to the roofline of the vehicle. Hence the panel 22, which is connected to the lifter arms 90 as described previously, translates along a plane slightly inclined to the vehicle roof. The geometry is preferably arranged to enable the panel 22 to pass under the vehicle roof when the lifter arm 90 and panel 22 slide rearwardly to open, as known in the art per se.

The rear sliders 124 also slide along the track 26 in unison with the lifter arm 90 due to the linkage 122 therebetween. The rain gutter 126 thus follows the panel 22 when the latter moves linearly.

In the sliding mode of operation, the lifter arm lock element 108 travels freely in the guide portion 50 of track 26, i.e., the arresting block 114 does not stop the lifter arm lock element 108, and the lifter arm 90 does not tilt. The lifter arm 90 is capable of sliding forwardly in the track 26 until the lifter arm lock element 108 engages the stop wall 116 of the arresting block 114, as shown in FIG. 12B, thus inhibiting the forward translation of the lifter arm 90 and panel 22. Simultaneously, an end wall (or other stop) embedded in the track 26 (not explicitly shown) also stops the front slider 102 of the lifter arm 90. This position marks the dividing point between the slide and tilt modes of operation.

FIGS. 12C and 12D show the sunroof in the tilt mode of operation. While the lifter arm 90 is inhibited from forward translation, the trolley 80 can still continue to translate in the forward direction through actuation of the screw drive. As the trolley 80 moves forward, the wedge 84 leaves the detent portion 96 of the lifter arm 90, following the remainder of the cam surface. As a result of the cam profile, the wedge 84 urges the lifter arm 90 upwardly. The lifter arm 90, which is prohibited from forward movement, thus pivots about the front slider 102, which has a somewhat angular footprint so as to allow it to rock slightly despite being entrained in the track 26.

As the lifter arm pivots, the lifter arm lock element 108 rises through an opening 119 in the track 26 and into the locking channel 120 of the arresting block 114. At this point, the lifter arm 90 is prevented from moving forwardly or rearwardly as a result of any external forces that may be applied to the sunroof.

In addition, as the lifter arm 90 pivots, its integral tab 103 engages and actuates the wind deflector 34, urging it to a non-active position. This increases the volume of air allowed to enter the passenger cabin.

As the sunroof is installed at a slight angle to the roofline of the vehicle, the flush position of the sunroof (i.e., wherein the panel 22 is flush with the vehicle roof) occurs at a predetermined tilt angle of the lifter arm 90, as seen in FIG. 12C. The notch or flat section 132 in the cam surface profile corresponds to the flush position. This flat section 132 is designed to inhibit angular motion of the panel 22 as the trolley 80 is translated along this region, thus providing some play in the linear position of the trolley 80 corresponding to the flush position of the panel 22. This decreases the accuracy required of any drive position sensing means.

The control electronics required to control the drive mechanism are relatively straightforward. A variety of options are available for sensing the linear position of the trolley 80 and/or the angular position of the lifter arms 90. For example, a relatively simple position sensing means can be provided by ohmic contact sensors or mechanically actuated switches installed in at least one track 26 to sense the linear position of the trolley 80 corresponding to the sunroof flush position (the "park" position) and the trolley end of travel positions (which define the maximum open position of the panel 22 and the maximum tilt position). Furthermore, a current sensor could also be installed for determining when the motor 152 stalls, which will occur at the trolley end of travel positions. Alternatively, more sophisticated position sensing means can be used such as magnetic or optical linear encoders where, for example, a sensing element is mounted to the trolley 80 and a detected element is mounted to the track 26. Alternatively still, an absolute position encoder can be mounted to the output shaft of motor 152, output shaft 168, or the reduction gear 160 to determine the linear position of the trolley 80 based on the angular position of the motor 152. A virtual absolute position encoder can also be utilized wherein the position of the trolley 80 can be surmised from sensing a gross or rough position of the trolley 80 provided, for example, by a magnet, combined with sensing the incremental position of the motor shaft. See, for example, U.S. Pat. No. 4,503,374 to Sakano, U.S. Pat. No. 4,535,277 to Kurakake, U.S. Pat. No. 4,876, 494 to Daggett et al, U.S. Pat. No. 5,030,900 to Kono et al, and JP Publication No. 61103757.

The motor controller can be a simple current polarity controller for responding to switch inputs and controlling the rotational sense of the screw drive as in most implementations there will be no need to control the motor output torque or speed, as the gear train can be configured to provide sufficient operational torque for a selected motor. Alternatively, a more sophisticated microprocessor based controller can be employed to provide functions such as automatic panel closure to the flush panel position. The particulars of the control electronics are not important to the invention and indeed in some implementations the invention may be realized by a hand crank operatively coupled via a gear train to the two power screws.

Figure 13A:
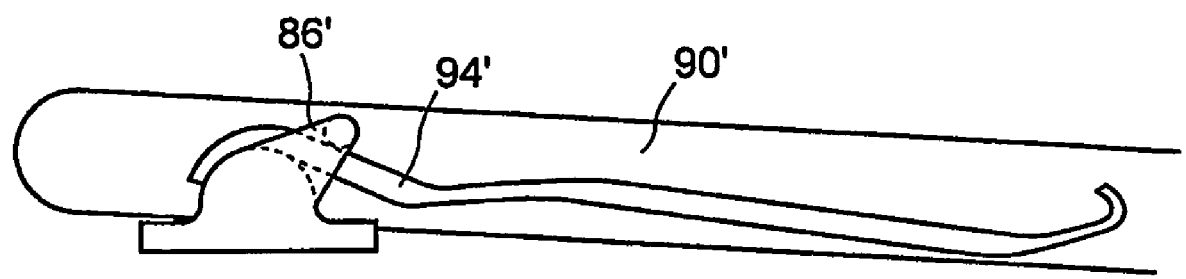
FIGS. 13A-13C are schematic diagrams of a lifter arm and trolley combination according to an alternative embodiment of the invention.
Figure 13B:
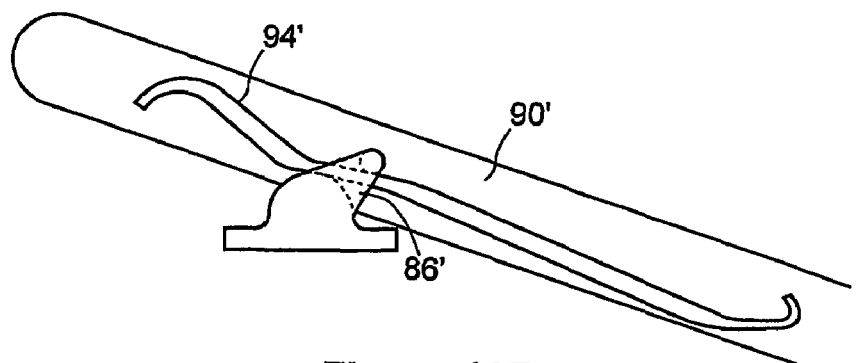
Figure 13C:
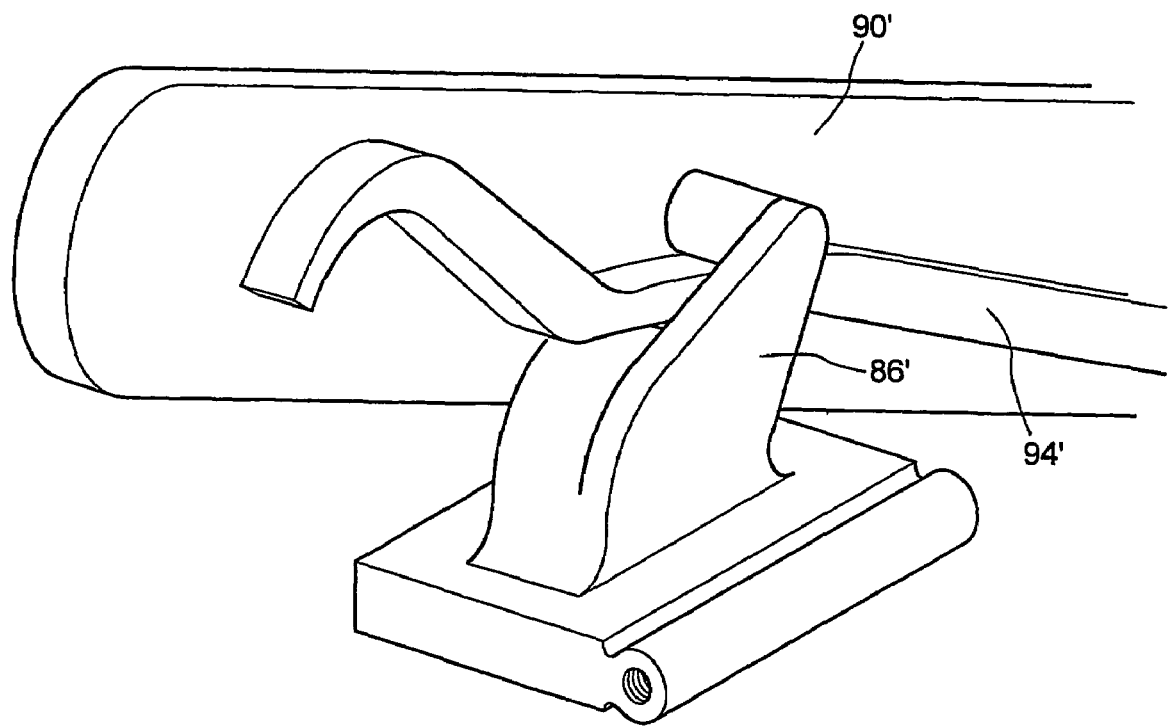

The illustrated embodiment has shown a wedge 84, pivot arm 86 and roller 88, mounted on a trolley 80, which engage the cam surface provided by flange 94 of the lifter arm 90. In one variant of the invention, seen in FIGS. 13A-13C, pivot arm 86' can be fixed (i.e., non-pivoting) and cam surface of flange 94' can have a varying thickness. The tilt angle of lifter arm 90' can thus be controlled by the profile of the flange 94' and its thickness in relation to the length of the pivot arm 86'. The detent portion of the flange 94' can also be eliminated by increasing the thickness of the flange 94' to exceed the length of the pivot arm (not shown). Those skilled in the art will appreciate that a variety of other modifications may be made to the embodiments described herein without departing from the spirit of the invention.

What is claimed is:

1. A mechanism for tilting and sliding a panel relative to a support surface having an opening therein selectively coverable by the panel, the tilt and slide mechanism comprising:
   a frame, including a track, for mounting to the support surface;
   a lifter arm for mounting the panel thereon, wherein the lifter arm includes at least one foot disposed to slide along the track and the track includes a stop cooperating with the lifter arm to arrest its linear translation along the track;
   a cam follower disposed to slide along the track, the cam follower including a wedge and a pivot arm mounted to the wedge, the pivot arm having a roller mounted thereto; and
   an actuator for linearly translating the cam follower;
   wherein the lifter arm includes a cam profile provided as a flange on the lifter arm that is sandwiched between the wedge and the roller such that the cam follower is co-operable therewith to linearly translate the lifter arm until its linear motion is arrested and to pivotably tilt the lifter arm when its linear motion is arrested.

2. A mechanism according to claim 1, wherein the actuator includes a screw rotatably mounted to the frame and the cam follower includes a threaded bore in meshing engagement with the screw so as to slide along the track when the screw is rotated.

3. A mechanism according to claim 2, wherein the actuator includes a motor having an output shaft and a flexible drive cable operatively coupled between the output shaft and one end of the screw.

4. A mechanism according to claim 3 having two said tracks and two said screws arranged in parallel, each track having one of said lifter arms and one of said cam followers disposed therein, and further including a transmission for coupling the motor to two said flexible drive cables, each of which is coupled to one end of the corresponding screw.

5. A mechanism according to claim 4, wherein the cam profile includes a detent portion and the wedge is seatable in the detent portion as the lifter arm is linearly translated and movable out of the detent portion to follow the remainder of the cam surface in order to pivotably tilt the lifter arm.

6. A mechanism according to claim 5, wherein the detent portion includes an abutment therein preventing the roller from moving past the abutment.

7. A mechanism according to claim 6, wherein the at least one foot includes a front slider which is pivotable in the track.

8. A mechanism according to claim 7, wherein the track includes means co-operable with the front slider to arrest the linear translation of the lifter arm.

9. A mechanism according to claim 8, wherein the lifter arm includes a lock element slidable in the track, and the track includes a stop wall co-operable with the lock element to arrest the linear translation of the lifter arm.

10. A mechanism according to claim 9, wherein the track includes an opening therein adjacent the stop wall and the opening leads to a channel extraneous of the track, the lifter arm lock element moving into the channel as the lifter arm pivots.

11. A mechanism according to claim 10, including a panel attached to the lifter arm.

12. A mechanism for tilting and sliding a panel relative to a support surface having an opening therein selectively coverable by the panel, the tilt and slide mechanism comprising:
   a frame, including a track, for mounting to the support surface;
   a lifter arm for mounting the panel thereon, wherein the lifter arm includes at least one foot disposed to slide along the track and the track includes a stop cooperating with the lifter arm to arrest its linear translation along the track;
   a wedge disposed to slide parallel to the track, wherein the wedge includes a pivot arm mounted thereto, the pivot arm having a roller mounted thereto; and
   an actuator for linearly translating the wedge;
   wherein the lifter arm includes a cam profile provided as a flange on the lifter arm that is sandwiched between the wedge and the roller, and wherein the cam profile has a detent portion enabling the wedge to linearly translate the lifter arm until its linear motion is arrested, the wedge moving out of the detent portion to follow the remainder of the cam profile and pivotably tilt the lifter arm when its linear motion is arrested.

13. A mechanism according to claim 12, wherein the actuator includes a screw rotatably mounted to the frame and the wedge is part of a trolley slidably mounted in the track and having a threaded bore in meshing engagement with the screw so as to slide along the track when the screw is rotated.

14. A mechanism according to claim 13, including a motor having an output shaft and a flexible drive cable operatively coupled between the output shaft and one end of the screw.

15. A mechanism according to claim 14 having two said tracks and two said screws arranged in parallel, each track having one of said lifter arms and one of said wedges disposed therein, and further including a transmission for coupling the motor to two said flexible drive cables, each of which is coupled to one end of the corresponding screw.

16. A mechanism according to claim 15, wherein the detent portion includes an abutment therein preventing the roller from moving past the abutment.

17. A mechanism according to claim 16, wherein the at least one foot includes a front slider which is pivotable in the track.

18. A mechanism according to claim 17, wherein the track includes means co-operable with the front slider to arrest the linear translation of the lifter arm.

19. A mechanism according to claim 18, wherein the lifter arm includes a lock element slidable in the track, and the track includes a stop wall co-operable with the lock element to arrest the linear translation of the lifter arm.

20. A mechanism according to claim 19, wherein the track includes an opening therein adjacent the stop wall and the opening leads to a channel extraneous of the track, the lifter arm lock element moving into the channel as the lifter arm pivots.

21. A mechanism according to claim 20, including a panel attached to the lifter arm.

22. A mechanism for tilting and sliding a panel relative to a support surface having an opening therein selectively coverable by the panel, the tilt and slide mechanism comprising:
   a frame, including one or more tracks, for mounting to the support surface;

one or more lifter arms for mounting the panel thereon, wherein each lifter arm includes at least one foot disposed to slide along one of the tracks and each track includes a stop cooperating with the corresponding lifter arm to arrest its linear translation along the track;

a trolley disposed to slide along each track, wherein each trolley includes a wedge having a pivot arm pivotally mounted thereto and a roller rotatably mounted to the pivot arm; and an actuator for linearly translating the trolleys;

wherein each lifter arm has a cam surface sandwiched between the wedge and the roller of each corresponding trolley to linearly translate the lifter arm along the corresponding track as the trolley is translated when the lifter arm is free to linearly translate and to pivotably tilt the lifter arm as the trolley is further translated when the lifter arm is arrested from linearly translating.

\* \* \* \* \*